(12) United States Patent
Mao et al.

(10) Patent No.: US 10,872,274 B2
(45) Date of Patent: Dec. 22, 2020

(54) CHARACTER RECOGNITION METHOD AND DEVICE

(71) Applicant: ALIBABA GROUP HOLDING LIMITED, Grand Cayman (KY)

(72) Inventors: Xudong Mao, Hangzhou (CN); Xing Shi, Hangzhou (CN); Wei Chu, Hangzhou (CN); Mengli Cheng, Hangzhou (CN); Wenmeng Zhou, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 163 days.

(21) Appl. No.: 16/144,219

(22) Filed: Sep. 27, 2018

(65) Prior Publication Data
US 2019/0026607 A1    Jan. 24, 2019

Related U.S. Application Data

(63) Continuation of application No. PCT/CN2017/077254, filed on Mar. 20, 2017.

(30) Foreign Application Priority Data

Mar. 29, 2016    (CN) .......................... 2016 1 0188113

(51) Int. Cl.
  *G06K 9/00*    (2006.01)
  *G06K 9/62*    (2006.01)
  (Continued)

(52) U.S. Cl.
  CPC ....... *G06K 9/6262* (2013.01); *G06K 9/00469* (2013.01); *G06K 9/325* (2013.01);
  (Continued)

(58) Field of Classification Search
  CPC ...... G06K 9/6262; G06K 9/62; G06K 9/6267; G06K 9/6261; G06K 9/6257;
  (Continued)

(56) References Cited

U.S. PATENT DOCUMENTS 5,542,006 A    7/1996   Shustorovich et al.
5,577,135 A    11/1996  Grajski et al.
(Continued)

FOREIGN PATENT DOCUMENTS

CN    101140625 A    3/2008
CN    101630367 A    1/2010
(Continued)

OTHER PUBLICATIONS

Girshick et al. "Fast R-CNN", IEEE International Conference on Computer Vision (Year: 2015).*
(Continued)

*Primary Examiner* — Aaron W Carter (57) ABSTRACT

A character recognition method and apparatus are disclosed, relate to the field of image recognition technologies, reduce a calculation time, and increase character recognition efficiency. The method includes: obtaining picture data (110); performing calculation on the picture data by using calculation layers shared by a first classifier and a second classifier, to obtain a first result, where the first classifier is a classifier for recognizing a specific character in the picture data, and the second classifier is a classifier for recognizing whether the picture data is a character picture (120); performing calculation by bringing the first result into remaining calculation layers other than the shared calculation layers in the first classifier, to obtain a first probability corresponding to each character (130); performing calculation by bringing the first result into remaining calculation layers other than the shared calculation layers in the second
(Continued)

classifier, to obtain a second probability (140); calculating, based on the first probability and the second probability, a confidence value that the picture data is recognized as each character (150); and outputting a character recognition result based on the confidence (160).

15 Claims, 3 Drawing Sheets

(51) Int. Cl.
*G06K 9/32* (2006.01)
*G06N 3/08* (2006.01)
*G06N 7/00* (2006.01)

(52) U.S. Cl.
CPC ............. *G06K 9/62* (2013.01); *G06K 9/6228* (2013.01); *G06K 9/6257* (2013.01); *G06K 9/6261* (2013.01); *G06K 9/6267* (2013.01); *G06N 3/08* (2013.01); *G06N 7/005* (2013.01); *G06K 2209/01* (2013.01)

(58) Field of Classification Search
CPC .. G06K 9/6228; G06K 9/325; G06K 9/00469; G06K 9/6256; G06K 2209/01; G06N 7/005; G06N 3/08
See application file for complete search history.

(56) References Cited

U.S. PATENT DOCUMENTS

| | | | |
|---|---|---|---|
| 5,638,491 A | 6/1997 | Moed | |
| 5,745,599 A | 4/1998 | Uchiyama et al. | |
| 5,835,633 A * | 11/1998 | Fujisaki | G06K 9/6292 382/187 |
| 5,912,986 A * | 6/1999 | Shustorovich | G06K 9/32 382/156 |
| 6,026,177 A | 2/2000 | Mong et al. | |
| 6,038,343 A | 3/2000 | Shimizu et al. | |
| 6,363,171 B1 | 3/2002 | Kovacs | |
| 7,336,827 B2 | 2/2008 | Geiger et al. | |
| 7,469,062 B2 | 12/2008 | Napper | |
| 7,646,913 B2 | 1/2010 | Abdulkader et al. | |
| 9,858,496 B2 * | 1/2018 | Sun | G06N 3/084 |
| 2003/0174881 A1 * | 9/2003 | Simard | G06K 9/4628 382/159 |
| 2005/0163377 A1 | 7/2005 | Walch | |
| 2007/0014475 A1 | 1/2007 | Prymus et al. | |
| 2007/0065003 A1 | 3/2007 | Kellerman et al. | |
| 2007/0140561 A1 | 6/2007 | Abdulkader et al. | |
| 2008/0025610 A1 | 1/2008 | Abdulkader | |
| 2015/0036920 A1 * | 2/2015 | Wu | G06K 9/6272 382/156 |
| 2015/0347860 A1 | 12/2015 | Meier et al. | |
| 2017/0206431 A1 * | 7/2017 | Sun | G06F 16/5838 |
| 2019/0026607 A1 * | 1/2019 | Mao | G06K 9/62 |
| 2020/0035362 A1 * | 1/2020 | Abou Shousha | G06N 20/10 |

FOREIGN PATENT DOCUMENTS

| | | |
|---|---|---|
| CN | 102375991 A | 3/2012 |
| CN | 103530600 A | 1/2014 |
| CN | 103971091 A | 8/2014 |
| CN | 103996057 A | 8/2014 |
| CN | 105095889 A | 11/2015 |
| CN | 105224939 A | 1/2016 |
| JP | 2009048641 A | 3/2009 |

OTHER PUBLICATIONS

International Preliminary Report on Patentability Chapter I for PCT Application No. PCT/CN2017/077254 dated Oct. 11, 2018 (11 pages).
Ren et al., "Faster R-CNN: Towards Real-Time Object Detection with Region Proposal Networks," IEEE Transactions on Patter Analysis and Machine Intelligence, vol. 39, No. 6, Jan. 6, 2016, pp. 1137-1149 (14 pages).
Liu et al., "Car plate character recognition using a convolutional neural network with shared hidden layers," 2015 Chinese Automation Congress (CAC), IEEE, Nov. 27, 2015, pp. 638-643 (6 pages).
Extended Search Report for European Application No. 17773076.9 dated Sep. 5, 2019 (8 pages).
International Search Report and Written Opinion for Application No. PCT/CN2017/077254, dated Jun. 22, 2017, 9 pages.
First Search dated Apr. 14, 2020, issued in related Chinese Application No. 201610188113.8 (2 pages).
First Office Action dated Apr. 20, 2020, issued in related Chinese Application No. 201610188113.8, with English machine translation (17 pages).

* cited by examiner

CHARACTER RECOGNITION METHOD AND DEVICE

CROSS REFERENCE TO RELATED APPLICATIONS

The present application is a continuation application of the International Patent Application No. PCT/CN2017/077254, filed on Mar. 20, 2017, and titled "CHARACTER RECOGNITION METHOD AND DEVICE," which claims priority to the Chinese Patent Application No. 201610188113.8 filed on Mar. 29, 2016. The entire contents of all of the above applications are incorporated herein by reference in their entirety.

TECHNICAL FIELD

This application relates to the field of image recognition technologies, and in particular, to a character recognition method and a character recognition apparatus.

BACKGROUND

With rapid development of computer technology and digital image processing technology, recent years witness, in various aspects, increasing and relatively wide application requirements for picture recognition technology, particularly technology for recognizing characters in pictures, such as digits, letters, or special symbols.

Currently, a process of recognizing a character in a picture includes:
1. Detect a location of the character in the picture;
2. Obtain, through partitioning, picture data including a single character; and
3. Recognize each piece of picture data by using a character classifier.

For the character classifier, currently there are mainly the following two implementation solutions: (1) First, extract a characteristic of the picture, such as a histogram of oriented gradient (HOG) characteristic, and then train a character recognition model by using a support vector machine (SVM) classifier, a neural network classifier, or the like. (2) Train a character recognition model by using a convolutional neural network (CNN). Then, character recognition is performed on entered picture data by using the trained character recognition model.

However, in an actual application process, for example, when a picture is relatively blurry or a picture includes relatively many characters, a detected character location may not be accurate enough, and there are some noises in the picture, for example, a spot, or the like that is not a character being detected as a character. Consequently, some picture data including noises exist in picture data obtained through partitioning. After each piece of picture data is recognized by using a classifier, an output result that is not a noise needs to be filtered out of the picture data. Using recognition of an identification card as an example, as shown in FIG. 1A, FIG. 1A is a single character graph obtained from an identification card number area of an identification card picture through partitioning. As shown in FIG. 1A, when the picture is relatively blurry, it is not very accurate to locate a number row, and there are some additional noises in the head or the tail. When a single character is obtained through partitioning, a front noise is obtained through the partitioning. Consequently, there are more than 18 single characters obtained through the partitioning, and 18 digits need to be selected.

For the foregoing problem, an existing technical solution is to add a CNN classifier for recognizing whether the data is a character. Picture data that is not a character is first excluded by using this classifier, and then remaining picture data is recognized by using a character classifier for recognizing which character type does a character belongs to, to recognize a specific character from the remaining picture data. However, the technical solution has some disadvantages, including:

First, a classifier is added, and the classifier successively performs calculation. This means that a calculation time is increased, and running efficiency is affected.

Second, in an actual operation, if an error occurs in a calculation result of a CNN classifier for recognizing whether the data is a digit, an error inevitably occurs in an entire recognition process no matter whether a problem occurs in a subsequent character recognition model, consequently reducing accuracy of character recognition.

SUMMARY

In view of the foregoing problem, the present disclosure provides character recognition methods and apparatuses that overcome the foregoing problem or at least partially resolve the foregoing problem.

To resolve the foregoing problem, this application discloses a character recognition method, including:
   obtaining picture data;
   performing calculation on the picture data by using calculation layers shared by a first classifier and a second classifier, to obtain a first result, where the first classifier is a classifier for recognizing a specific character in the picture data, and the second classifier is a classifier for recognizing whether the picture data is a character picture (i.e., a picture of a character);
   performing calculation by bringing the first result into remaining calculation layers other than the shared calculation layers in the first classifier, to obtain a first probability corresponding to each character;
   performing calculation by bringing the first result into remaining calculation layers other than the shared calculation layers in the second classifier, to obtain a second probability;
   calculating, based on the first probability and the second probability, a confidence value that the picture data is recognized as each character; and
   outputting a character recognition result based on the confidence value.

In some embodiments, the method further includes:
   training parameter values of each calculation layer of the first classifier by using character picture samples, where the first classifier includes first N calculation layers and last M calculation layers; and
   fixing parameters of first N calculation layers of the second classifier with parameters of the first N calculation layers of the first classifier, and training parameter values of last L layers of the second classifier by using non-character picture samples and character picture samples.

In some embodiments, the calculation layers shared by the first classifier and the second classifier includes:
   one or more convolutional layer, or one or more convolutional layer and at least one fully connected layer.

In some embodiments, the character is a digit.

In some embodiments, the step of obtaining picture data includes partitioning each piece of picture data from a number area of a picture of an identification card.

In some embodiments, the step of calculating, based on the first probability and the second probability, a confidence value that the picture data is recognized as each character includes multiplying a maximum first probability by the second probability, to obtain a confidence value that the picture data is a digit corresponding to the maximum first probability.

In some embodiments, for example, the picture is a picture of an identification card. The identification card number to be recognized may include a fixed number of numbers, for example, 18 numbers. The step of outputting a character recognition result based on the confidence value includes selecting, from each piece of picture data, digits corresponding to a number (e.g., 18) of pieces of picture data, each piece corresponding to a digit of the 18 digits, that have the highest confidence values, and outputting the digits in sequence.

This application further discloses a character recognition apparatus, including:

a picture obtaining module, suitable for obtaining picture data;

a first result calculation module, suitable for performing calculation on the picture data by using calculation layers shared by a first classifier and a second classifier, to obtain a first result, where the first classifier is a classifier for recognizing a specific character in the picture data, and the second classifier is a classifier for recognizing whether the picture data is a character picture;

a first probability calculation module, suitable for performing calculation by bringing the first result into remaining calculation layers other than the shared calculation layers in the first classifier, to obtain a first probability corresponding to each character;

a second probability calculation module, suitable for performing calculation by bringing the first result into remaining calculation layers other than the shared calculation layers in the second classifier, to obtain a second probability;

a confidence value calculation module, suitable for calculating, based on the first probability and the second probability, a confidence value that the picture data is recognized as each character; and an output module, suitable for outputting a character recognition result based on the confidence value.

In some embodiments, the apparatus further includes:

a first classifier training module, suitable for training parameter values of each calculation layer of the first classifier by using a character picture sample, where the first classifier includes first N calculation layers and last M calculation layers; and a second classifier training module, suitable for fixing parameters of first N calculation layers of the second classifier with parameters of the first N calculation layers of the first classifier, and training parameters of last L layers of the second classifier by using non-character picture samples and character picture samples.

In some embodiments, the calculation layer shared by the first classifier and the second classifier includes one or more convolutional layer, or one or more convolutional layer and at least one fully connected layer.

In some embodiments, the character is a digit.

In some embodiments, the picture obtaining module includes a picture partitioning submodule, suitable for partitioning each piece of picture data from a number area of a picture of an identification card.

In some embodiments, the confidence value calculation module includes a confidence value calculation submodule, suitable for multiplying a maximum first probability by the second probability, to obtain a confidence value that the picture data is a digit corresponding to the maximum first probability.

In some embodiments, the picture is an identification card, which has 18 digits of identification number. The output module may include an output submodule, suitable for selecting, from each piece of picture data, digits corresponding to a number (e.g., 18 for an identification card in China) of pieces of pictures, each piece corresponding to a digit, that have the highest confidence value, and outputting the digits in sequence.

The present application further provides a system for character recognition. According to some embodiments, the system may include a first classifier for recognizing a specific character in picture data, the first classifier comprising at least one convolutional layer, at least one fully connected layer, and at least one Softmax layer, and a second classifier for recognizing whether the picture data is a picture of a character, the second classifier comprising at least one convolutional layer, at least one fully connected layer, and at least one Softmax layer. The first classifier and the second classifier share at least one convolutional layer.

In one specific embodiment, the first classifier includes at least two convolutional layers, at least two fully connected layers, and a Softmax layer and the second classifier includes at least two convolutional layers, at least two fully connected layers, and a Softmax layer, and the first classifier and the second classifier share at least two convolutional layers and at least one fully connected layer.

The embodiments of this application include the following advantages:

In the embodiments of this application, after picture data is obtained, calculation is performed on the picture data by using the calculation layers shared by the first classifier and the second classifier, to obtain a first result; then calculation is separately performed by bringing the first result into the remaining calculation layers other than the shared calculation layers in the first classifier, to obtain the first probability corresponding to each character; calculation is performed by bringing the first result into the remaining calculation layers other than the shared calculation layers in the second classifier, to obtain the second probability; the confidence value that the picture data is recognized as each character is calculated based on the first probability and the second probability; and finally the character recognition result is output based on the confidence value.

The second classifier shares some calculation layers with the first classifier. For the calculation layers shared by the second classifier and the first classifier, a calculation process and a calculation result thereof are also shared. Therefore, compared with the process, in the background technology, of adding a complete classifier for recognizing whether the data is a character before a character classifier and then performing calculation on a picture in sequence, this application increases a relatively little calculation amount, thereby reducing a calculation time, and increasing character recognition efficiency compared with the background technology.

In addition, the second classifier and the first classifier are not used in sequence, but probability values respectively obtained by the two classifiers are multiplied by each other to obtain a confidence value, and then a corresponding recognition result is outputted based on the confidence value. Compared with the background technology, character recognition accuracy is increased, and a problem that occurs in the classifier for recognizing whether the data is a character does not severely affect an entire recognition process.

DETAILED DESCRIPTION OF THE INVENTION

To enable the foregoing objectives, characteristics, and advantages of this application to be clearer and easier to understand, the following further describes the embodiments of this application in detail with reference to accompanying drawings and specific implementations.

According to the embodiments of this application, after picture data is obtained, calculation is performed on the picture data by using one or more calculation layer shared by a first classifier and a second classifier, to obtain a first result; then calculation is separately performed by bringing the first result into remaining calculation layers other than a shared calculation layers in the first classifier, to obtain a first probability corresponding to each character; calculation is performed by bringing the first result into remaining calculation layers other than the shared calculation layers in the second classifier, to obtain a second probability; a confidence value that picture data is recognized as each character is calculated based on the first probability and the second probability; and finally a character recognition result is output based on the confidence value. In this application, the first classifier that recognizes a specific character in picture data and the second classifier that recognizes whether picture data is a character picture can share some calculation layer data, so that picture data can be recognized during calculation, in addition, calculation processes are overlapped, thereby reducing a calculation amount, and increasing calculation accuracy; and in addition, a picture is recognized by using calculation results of the two classifiers, thereby increasing accuracy, and reducing impact that a problem occurring in the second classifier has on the entire recognition process.

Embodiment 1

Figure 1:
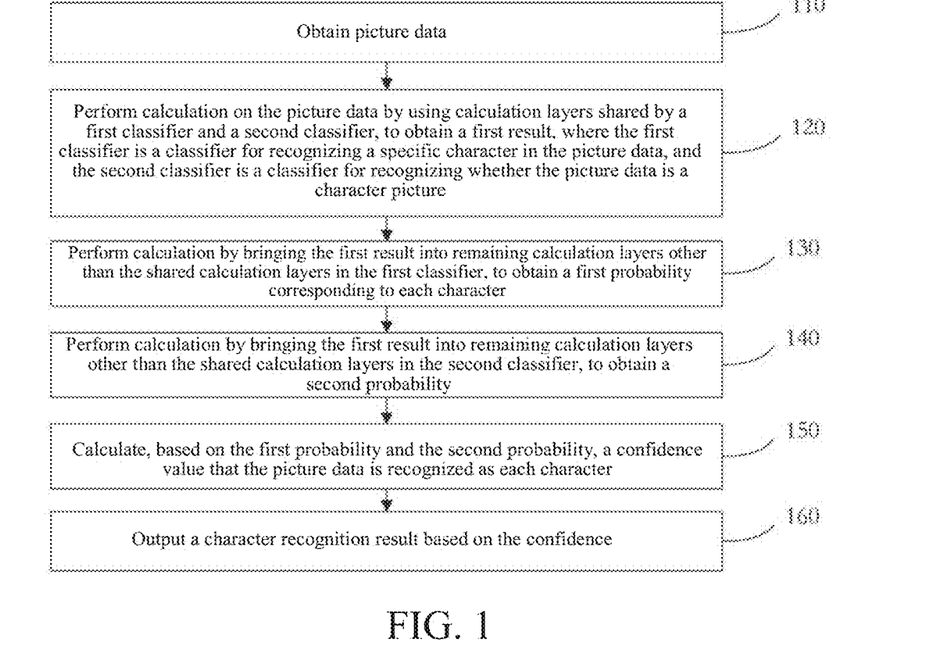
FIG. 1 is a flowchart of steps of an embodiment of a character recognition method according to this application.
Figure 1A:
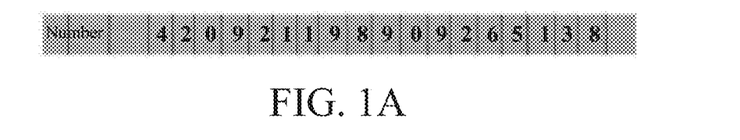
FIG. 1A is a schematic diagram of an identification card number according to this application.

FIG. 1 is a flowchart of steps of an embodiment of a character recognition method according to this application. The method may specifically include the following steps.

Step 110: Obtain picture data.

This application describes a character recognition method for pictures. Picture data needing to be recognized needs to be obtained first.

A picture is print media formed by a graph, an image, and the like. The picture data in this application is a digital picture. There are many common storage formats for the digital picture, for example, Bitmap (BMP), Tagged Image File Format (TIFF), Joint Photographic Experts Group (JPEG), Graphics Interchange Format (GIF), PSD (Photoshop special format), and Portable Document Format (PDF). However, this application does not limit a storage format of a specific digital picture.

In this embodiment of this application, the picture data obtained in step 110 may be further pre-treated. For example, graying is performed on the picture data, and then the color picture data can be changed into gray picture data, so that a calculation amount can be reduced.

Step 120: Perform calculation on the picture data by using one or more calculation layer shared by a first classifier and a second classifier, to obtain a first result, where the first classifier is a classifier for recognizing a specific character in the picture data, and the second classifier is a classifier for recognizing whether the picture data is a character picture.

To reduce a possibility of recognition error, in this application, the picture data is recognized by using the two classifiers, where the first classifier may be configured to recognize the specific character in the picture data, and the second classifier may be configured to recognize whether the picture data is the character picture. In addition, to reduce time costs of the recognition, and increase recognition efficiency and accuracy, the first classifier and the second classifier share some calculation layers.

In this embodiment of the application, the specific character may be a character such as an Arabic numeral from 0 to 9, or a Greek character such as $\alpha$, $\beta$, or $\gamma$, or may be another character. The specific character may be specifically set based on an actual requirement. A corresponding model may be correspondingly determined based on a corresponding character.

Figure 1B:
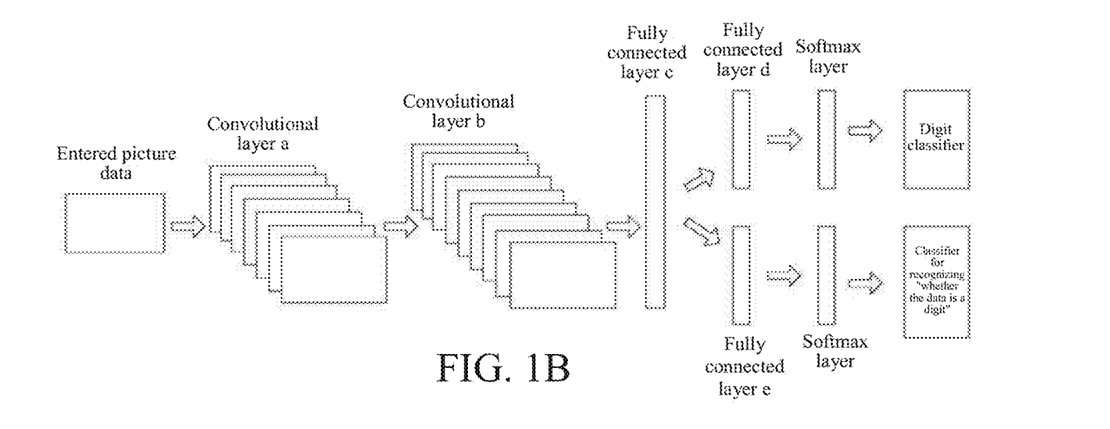
FIG. 1B is a schematic diagram of a first classifier and a second classifier according to this application.

Both the first classifier and the second classifier may use a convolutional neural networks (CNN) classification model. The CNN classification model includes at least one convolutional layer, at least one fully connected layer, and at least one Softmax layer. For example, FIG. 1B is a schematic diagram of a first classifier and a second classifier. A convolutional layer a, a convolutional layer b, a fully connected layer c, a fully connected layer d, a Softmax layer, and a digit classifier form the first classifier, and the convolutional layer a, the convolutional layer b, the fully connected layer c, a fully, connected layer e, the Softmax layer, and a classifier for recognizing whether the data is a digit form the second classifier. It can be learned that, in this case, calculation layers shared by the first classifier and the second classifier are the convolutional layer a, the convolutional layer b, and the fully connected layer c, and one fully connected layer and one Softmax layer are not shared by the first classifier and the second classifier. In FIG. 1B, both the first classifier and the second classifier include two convolutional layers, two fully connected layers, and one Softmax layer. However, in an actual application, specific numbers of convolutional layers and fully connected layers included in the first classifier and the second classifier may be flexibly set as required, and this is not limited in the embodiments of the application.

In the embodiments of the application, the first classifier may be first trained by using picture data samples of corresponding characters. For example, a first classifier for recognizing which digit type does a digit belongs to is trained by using picture samples of digits of 0 to 9. When training a first classifier, actually parameter values of each calculation layer of this classifier are trained. Therefore, in the embodiments of the application, after the first classifier is trained, parameters of some front calculation layers may be fixed. For example, parameters of all convolutional layers may be fixed. Then, when parameter values of the convolutional layers are fixed, parameter values of subsequent calculation layers are trained by using picture data samples that are not pictures of digits and picture data samples that are pictures of digits. In this way, the second classifier and the first classifier can share calculation layers whose parameter values are the same.

In the embodiments of the application, an optimal case is that convolutional layers and fully connected layers before the last fully connected layer are shared. In this way, a calculation amount can be reduced, and accuracy can be increased.

A calculation process for a convolutional layer is as follows:

It is assumed that a dimension of entered picture data is C×N×N, and a size of a convolutional kernel (kernel) of the convolutional layer is m×m. C indicates three channels of the picture data: red (R), green (G), and blue (B), two Ns in N×N respectively indicate a pixel size of the picture data in a horizontal direction and a pixel size of the picture data in a vertical direction. Based on different picture data that is entered, values of the two Ns may be different, or may be the same. This is not limited in the embodiments of the present invention. For the size m×m of the convolutional kernel, values of the two ms may also be the same or different. This is also not limited in the embodiments of the present invention. It should be noted that, a larger value of the two ms should be less than a smaller value of the two Ns. After the convolutional layer, an output value is:

$$y_{kij} = \sum_{c=0}^{C-1} \sum_{a=0}^{m-1} \sum_{b=0}^{m-1} w_{kij} x_{(k+c)(i+a)(j+b)} \quad \text{formula (1)}$$

where k, i, and j indicate coordinates of the output value, k corresponds to the three channels of R, G, and B of the picture data, i corresponds to a pixel location of the picture data in the horizontal direction, and j corresponds to a pixel location of the picture data in the vertical direction; w is a parameter value of the convolutional layer, x is an input value, and y is the output value. In the embodiments of this application, w is a known parameter, and may be obtained by training the convolutional layer in advance.

In the embodiments of this application, for each convolutional layer, there may be a plurality of convolutional kernels. For example, a quantity of convolutional kernels may be consistent with a dimension of the entered picture data, except the pixel size in the horizontal direction and the pixel size in the vertical direction, for example, C in the three-dimensional matrix C×N×N of the foregoing picture data. C represents three channels of R, G, and B of the picture data. Therefore, the convolutional layer may have three convolutional kernels such as the foregoing m×m, and in this case, a 3×m×m three-dimensional matrix formed by the convolutional kernels of the convolutional layer is a convolutional matrix of the convolutional layer. In specific operation processes, a convolution operation is performed on the three-dimensional matrix C×N×N of the entered picture data through each convolutional kernel m×m, to obtain a two-dimensional matrix. For example:

a convolution operation is performed by a first convolutional kernel m×m on picture data with C being the R channel, to obtain a two-dimensional matrix;

a convolution operation is performed by a second convolutional kernel m×m on picture data with C being the G channel, to obtain a two-dimensional matrix;

a convolution operation is performed by a third convolutional kernel m×m on picture data with C being the B channel, to obtain a two-dimensional matrix; and use the three two-dimensional matrices obtained through the convolution operations of the three convolutional kernels to form a three-dimensional matrix. This three-dimensional matrix is an output result of the convolutional layer shown in the formula (1).

A calculation formula for a fully connected layer is as follows:

It is assumed that the dimension of entered data is N, and then after the fully connected layer, an output value is:

$$y_i = \sigma\left(\sum_{a=0}^{N-1} w_a x_a\right) \quad \text{formula (2)}$$

where σ(*) is a sigmoid function, $$\sigma(x) = \frac{1}{1+e^{-x}},$$

and w is a parameter of the fully connected layer.

A calculation formula for a Softmax layer is as follows:

$$p(y^{(i)} = j \mid x^{(i)}; \theta) = \frac{e^{\theta_j^T x^{(i)}}}{\sum_{l=1}^{k} e^{\theta_l^T x^{(i)}}} \quad \text{formula (3)}$$

where x is an input value, j indicates each category, y indicates a category label, and θ is a parameter of the Softmax layer, and e is a constant. Using digits as an example, categories of y include 0, 1, 2, . . . , and 9. Then, the formula may be used to calculate probabilities, of digital picture data, corresponding to the nine digits of 0, 1, 2, . . . , and 9.

It is learned from the foregoing analysis and FIG. 1B that, after the obtained picture data is entered, calculation processes for calculation layers shared by the first classifier and the second classifier are consistent. Therefore, after the calculation layers shared by the first classifier and the second classifier, obtained first results are also consistent. Then, for calculation layers that are not shared by the first classifier and the second classifier, such as the fully connected layer d and the fully connected layer e in FIG. 1B, the first results are respectively used as inputs of the calculation layers that are not shared by the first classifier and the second classifier. In this case, calculation processes for the calculation layers that are not shared by the first classifier and the second classifier are different.

Therefore, in the embodiments of the application, calculation is first performed on the picture data by using calculation layers shared by the first classifier and the second classifier, to obtain a first result.

In some embodiments of this application, before step 120, the method further includes:

Step S11: Train parameter values of each calculation layer of the first classifier by using character picture samples, where the first classifier includes first N calculation layers and last M calculation layers.

Because parameters in the first classifier and the second classifier may be unknown, or for further increasing accuracy of the first classifier and the second classifier, in the embodiments of the application, before calculation processes are separately performed by using the first classifier and the second classifier, the parameters in the first classifier and the second classifier need to be first trained.

Probabilities finally calculated by the first classifier and the second classifier are essentially different. Therefore, for training of the first classifier, there is no need to consider situations that the picture data are not characters. Therefore, in the embodiments of the application, the parameter values of each calculation layer of the first classifier may be trained by using the character picture samples. The first classifier includes first N calculation layers and last M calculation layers. The first N calculation layers are calculation layers shared with the second classifier, and the last M calculation layers are calculation layers not shared with the second classifier.

In the embodiments of this application, the first classifier may be trained by using at least one character picture sample. The character picture sample is a character picture sample for which a character is definitely recognized. Character types included in the character picture sample should be greater than character types that are set to be recognizable for the first classifier and the second classifier. Therefore, it can be learned that, corresponding to the character picture sample, a probability that the character picture sample is recognized as a character corresponding to the character picture sample is 1, and a probability that the character picture sample is recognized as another character is always 0. In this case, parameters of the first classifier may be trained by using the character picture sample as an input of the first classifier and using, as ideal outputs, a type whose probability for the character picture sample is 0 and a type whose probability for the character picture sample is 1.

A training process mainly includes four steps, and the four steps are divided into two phases:

First phase, which is a forward propagation phase:

(1) A character picture sample is selected, and is input into the first classifier.

(2) A corresponding actual output is calculated. In this phase, the first classifier randomly generates initial parameters, and character picture data is transformed in a layer-by-layer manner from an input layer, and then is transmitted to an output layer. This process is also a process that is performed by the first classifier during normal execution after training is completed.

Second phase, which is a backward propagation phase:

(1) A difference between an actual output and a corresponding ideal output is calculated.

(2) The parameters are adjusted based on an error minimization method.

Work in the two phases should be generally controlled by a precision requirement, and the precision requirement may be flexibly set as required. This is not limited in this application.

The training of the first classifier is actually training a parameter w corresponding to each convolutional layer in the formula (1), a parameter w corresponding to each fully connected layer in the formula (2), and a parameter 0 in the Softmax layer. For different convolutional layers, w in the formula (1) is different; for different fully connected layers, w in the formula (2) is different.

Step S12: Fix parameters of first N calculation layers of the second classifier with parameters of the first N calculation layers of the first classifier, and train parameter values of last L layers of the second classifier by using non-character picture samples and character picture samples.

The first N calculation layers of the second classifier and the first N calculation layers of the first classifier are shared. Therefore, after the parameters of the first N calculation layers of the first classifier are determined, correspondingly, the parameters of the first N calculation layers of the second classifier are also determined. Only the parameter values of the last L layers of the second classifier may be trained, where L and M may be different, or may be the same. This is not limited in this application.

A probability that the entered picture data is a character picture is calculated by the second classifier. Therefore, during training of the second classifier, situations of having non-character pictures needs to be further considered. Therefore, in the embodiments of this application, the parameter values of the last L calculation layers of the second classifier may be trained by using at least one non-character picture sample and at least one character picture sample.

For a non-character picture sample, a probability that the non-character picture sample is a character picture is 0, and a probability that the non-character picture sample is not a character picture is 1. For a character picture sample, a probability that the character picture sample is a character picture is 1, and a probability that the character picture sample is not a character picture is 0. In this case, parameters of the second classifier may be trained by using each character picture sample as an input of the second classifier, and using a probability being 1 as an ideal output; and by using each non-character picture sample as an input of the second classifier, and a probability being 0 as an ideal output.

A specific training process is similar to the first classifier training process in step S11, and also includes four steps. The four steps are divided into two phases:

First phase, which is a forward propagation phase:

(1) Character picture samples or non-character picture samples are selected, and are input into the first classifier.

(2) Corresponding actual outputs are calculated. In this phase, the first classifier randomly generates initial parameters, and character picture data or non-character picture data is transformed in a layer-by-layer manner from an input layer, and then is transmitted to an output layer. This process is also a process that is performed by the second classifier during normal execution after training is completed.

Second phase, which is a backward propagation phase:

(1) A difference between an actual output and a corresponding ideal output is calculated.

(2) The parameters are adjusted based on an error minimization method.

Work in the two phases should be generally controlled by a precision requirement, and the precision requirement of the second classifier may also be flexibly set as required. This is not limited in this application.

It should be noted that, in another preferable embodiment of this application, the parameter values of the first N calculation layers and the last L layers calculation layers of the second classifier may alternatively be first trained by using the non-character picture samples and the character picture samples, then the parameters of first N calculation layers of the first classifier may be set as the parameters of the first N calculation layers of the second classifier, and then the parameter values of the last M calculation layers of the first classifier may be trained by using the character picture samples.

For training of the second classifier, if convolutional layers are shared with the first classifier, parameters in the formula (1) for each convolutional layer of the second classifier are determined in step S11; and then a parameter w corresponding to each fully connected layer in the formula (2) and a parameter θ in the Softmax layer are actually trained by using the foregoing (character picture data samples+non-character picture data samples).

If convolutional layers and some fully connected layers are shared with the first classifier, and certainly the shared fully connected layers are shared in a parameter input sequence, that is, fully connected layers that are arranged in the front small are shared. The parameters in the formula (1) for each convolutional layer of the second classifier is determined in step S11, and parameter w in the formula (2) for the shared fully connected layers is also determined in step S11. Then, a parameter w corresponding to remaining unshared fully connected layers in the formula (2) and a parameter θ in the Softmax layer are trained by using the foregoing training processes with (character picture data samples+non-character picture data samples).

Step 130: Perform calculation by bringing the first result into remaining calculation layers other than the shared calculation layers in the first classifier, to obtain a first probability corresponding to each character.

The first classifier is a classifier for recognizing a specific character in the picture data. The first probability that the picture data may be each character may be obtained by performing calculation by bringing the first result obtained in step 120 into the remaining calculation layers other than the shared calculation layers in the first classifier. For example, the first probability corresponding to each character may be obtained by bringing the first result as an input value into an entirety formed by the fully connected layer d and the Softmax layer 1 in the first classifier shown in FIG. 1B.

The character corresponding to the picture data may be an Arabic numeral from 0 to 9, or may be an English character from 52 uppercase characters A to Z and lowercase characters from a to z, or one or more types of characters that may appear in the picture data, such as a punctuation mark, a special symbol, a Chinese character, or a Roman alphabet. In the embodiments of this application, a corresponding specific character type may be set as required. This is not limited in this embodiment of the present invention.

If a possible character type has been set on the Softmax layer, the probability that the entered picture data may be each character, that is, the first probability that the entered picture data may be each character, can be calculated by using a classification algorithm of the Softmax layer.

Step 140: Perform calculation by bringing the first result into remaining calculation layers other than the shared calculation layers in the second classifier, to obtain a second probability.

The second classifier is a classifier for recognizing whether the picture data is a character picture. The second probability that the picture data is a character picture may be obtained by performing calculation by bringing the first result obtained in step 120 into the remaining calculation layers other than the shared calculation layers in the second classifier. For example, the second probability corresponding to each character may be obtained by bringing the first result as an input value into an entirety formed by the fully connected layer e and the Softmax layer 2 in the second classifier shown in FIG. 1B.

The second probability obtained by the second classifier is the probability that the picture data is the character picture. The character corresponding to the character picture may also be each type of character as discussed in step 130, and may be set as required. However, It should be noted that, the character type corresponding to the first classifier may be consistent with the character type corresponding to the second classifier, or the character type corresponding to the second classifier includes the character type corresponding to the first classifier. This is not limited in this embodiment of the present invention. Relatively speaking, when the character type corresponding to the first classifier is consistent with the character type corresponding to the second classifier, final character recognition efficiency and accuracy are higher. For the second classifier, the character picture is a picture including a character with its type being set, calculation of the probability that the picture data is the character picture is calculation of a probability that the picture data is a picture including a character with its type being set, and an obtained result is the second probability.

The second probability is calculated by the second classifier also by using the Softmax layer of the second classifier. If a possible character type has been set, the probability that the entered picture data may be the character picture, that is, the second probability that the entered picture data may be a character of the character type, can be calculated by using a classification algorithm of the Softmax layer.

It should be noted that, the first probability and the second probability calculated by the first classifier and the second classifier are essentially different. Therefore, parameters and structures of the remaining calculation layers, particularly the Softmax layers, other than the shared calculation layers, are different between the first classifier and the second classifier.

Step 150: Calculate, based on the first probability and the second probability, a confidence value that the picture data is recognized as each character.

As described above, the first probability is the probability that the picture data may be each character, and the second probability is the probability that the picture data may be a character picture. It can be learned that, for picture data, a quantity of first probabilities of the picture data is corresponding to a character type that is set. The quantity of first probabilities equals to a quantity of characters of the character type, and is at least one. If one piece of picture data is entered, only one second probability can be obtained. In this case, based on a first probability and a second probability of picture data, a confidence value that the picture data can be recognized as each character may be calculated. For example, the first probability that the picture data corresponds to each character may be multiplied by the second probability of the picture data, to obtain the confidence that the picture data is recognized as each character.

For example, if it needs to recognize whether a piece of picture data is an Arabic numeral from 0 to 9, ten first probabilities may be obtained by using the first classifier, and respectively correspond to probabilities that the picture data is Arabic numerals from 0 to 9. For example, a first probability P0 is a probability that the picture data is a character 0, a first probability p1 is a probability that the picture data is a character 1, and a first probability p9 is a probability that the picture data is a character 9. However, only one second probability can be obtained by using the second classifier, that is, a probability s that the picture data satisfies a specified condition, for example, is an Arabic numeral. In this case, p0 is multiplied by s, to obtain a confidence value that the picture data is recognized as the character 0, and p9 is multiplied by s, to obtain a confidence value that the picture data is recognized as the character 9.

Step 160: Output a character recognition result based on the confidence value.

In the embodiments of this application, based on the calculated confidence value that the picture data is recognized as each character, a character whose corresponding confidence value is the highest may be output as a recognition result.

For example, for the recognizing whether a piece of picture data is an Arabic numeral from 0 to 9 in step 150, if the confidence value obtained by multiplying p9 by s is the highest among the finally calculated confidence values corresponding to each character, the character 9 may be output as the recognition result.

In the embodiments of this application, after picture data is obtained, calculation is performed on the picture data by using the calculation layers shared by the first classifier and the second classifier, to obtain first result; then calculation is separately performed by bringing the first result into the remaining calculation layers other than the shared calculation layers in the first classifier, to obtain the first probability corresponding to each character; calculation is performed by bringing the first result into the remaining calculation layers other than the shared calculation layers in the second classifier, to obtain the second probability; the confidence value that the picture data is recognized as each character is calculated based on the first probability and the second probability; and finally the character recognition result is output based on the confidence value.

The second classifier shares some calculation layers with the first classifier. For the calculation layers shared by the second classifier and the first classifier, a calculation process and a calculation result thereof are also shared. Therefore, compared with the process, in the background technology, of adding a complete classifier for recognizing whether the data is a character before a character classifier and then performing calculation on a picture in sequence, this application increases a relatively little calculation amount, thereby reducing a calculation time, and increasing character recognition efficiency compared with the background technology.

In addition, the second classifier and the first classifier are not used in sequence, but probability values respectively obtained by the two classifiers are multiplied by each other to obtain a confidence value, and then a corresponding recognition result is outputted based on a value of the confidence. Compared with the background technology, character recognition accuracy is increased, and a problem that occurs in the classifier for recognizing whether the data is a character does not severely affect the entire recognition process.

Embodiment 2

Figure 2:
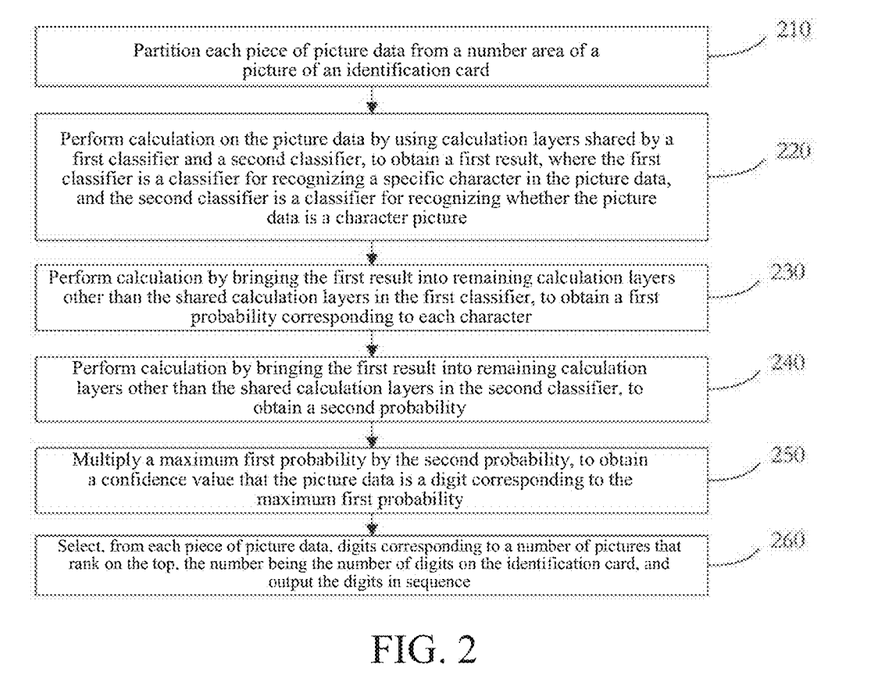
FIG. 2 is a flowchart of steps of an embodiment of a character recognition method according to this application.

FIG. 2 is a flowchart of steps of an embodiment of a character recognition method according to this application. The method may specifically include the following steps.

Step 210: Partition each piece of picture data from a number area of a picture of an identification card.

In this embodiment of this application, number recognition is performed on the picture of the identification card. The picture of the identification card may include a plurality of numbers, such as an identification card number. Therefore, for ease of the recognition, each piece of picture data needs to be first partitioned from the number area of the picture of the identification card. As shown in FIG. 1A, a plurality of pieces of picture data are obtained through the partitioning. For example, an area in which the identification card number is located is partitioned in sequence into picture data including only one number. The specific partitioning method is commonly known in the art. This is not described in detail in the embodiments of this application.

Step 220: Perform calculation on the picture data by using calculation layers shared by a first classifier and a second classifier, to obtain a first result, where the first classifier is a classifier for recognizing a specific character in the picture data, and the second classifier is a classifier for recognizing whether the picture data is a character picture.

In another preferable embodiment of this application, the calculation layers shared by the first classifier and the second classifier include: one or more convolutional layer, or one or more convolutional layer and one or more fully connected layer.

In one embodiment of this application, the character is a digit. In this case, the first classifier calculates a probability that the entered picture data is respectively any digit from 0 to 9, and the second classifier calculates a probability that the entered picture data may be recognized as a digit.

Step 230: Perform calculation by bringing the first result into a remaining calculation layers other than the shared calculation layers in the first classifier, to obtain a first probability corresponding to each character.

Step 240: Perform calculation by bringing the first result into remaining calculation layers other than the shared calculation layers in the second classifier, to obtain a second probability.

Step 250: Multiply a maximum first probability by the second probability, to obtain a confidence value that the picture data is a digit corresponding to the maximum first probability.

The maximum first probability is the probability corresponding to a digit that the entered picture data is most likely to be. A confidence value that the entered picture data is the digit corresponding to the maximum first probability may be obtained by multiplying the maximum first probability by the second probability.

Step 260: Select, from all of the pieces of picture data, digits corresponding to a number of pieces of picture data that rank on the top (i.e., pieces of picture data whose maximum probability of being a digit rank on the top among all the pieces of picture data). The number of pieces of picture data is consistent with the number on an identification card. The system then outputs the digits in sequence.

Each picture (i.e., a piece of picture data) obtained through partitioning has a probability of corresponding to a digit from 1 to 9. Based on a writing habit for an identification card, the pictures obtained through partitioning in FIG. 1B are a plurality of pictures that are arranged from left to right. In this application, a maximum probability that each picture corresponds to a digit from 0 to 9 is determined, then 18 pictures whose probabilities are the highest are selected from the arranged pictures based on the maximum probability for each picture. The selected digits with the corresponding maximum probabilities are sequenced according to the order of their corresponding picture on the identification card and assembled to obtain the identification card number.

In the embodiments of this application, picture sequence may be marked and recorded for the pictures during the picture partitioning in step 210. In step 260, the selected digits are sequenced according to the sequence of their corresponding pictures obtained in step 210.

For example, for character recognition of the identification card number shown in FIG. 1A, the identification card number is first partitioned into a plurality of pieces of character data. Based on the writing habit, the identification card number may be partitioned into 22 unconnected pieces of character data from left to right, which are successively a1 to a22 respectively. A confidence value that each piece of picture data is a digit corresponding to the maximum probability is calculated by using the first classifier and the second classifier, and then 18 pieces of picture data and digits corresponding to the maximum probability for the 18 pieces of picture data are selected in descending order of the confidence value. It is assumed that, picture data selected in descending order of the confidence value for each digit corresponding to the maximum probability in the picture is respectively: a5: (0.95, 2), a6: (0.94, 0), a12: (0.93, 8), a15: (0.92, 9), a11: (0.92, 9), a13: (0.90, 9), a16: (0.90, 2), a4: (0.89, 4), a10: (0.89, 1), a14: (0.88, 0), a7: (0.87, 9), a17: (0.86, 6), a8: (0.85, 2), a18: (0.84, 5), a9: (0.84, 1), a19: (0.83, 1), a20: (0.81, 3), a21: (0.80, 8), a2: (0.1, 8), a1: (0.1, 9), a22: (0.09, 0), and a3: (0.09, 0). However, in an outputting process, the sequence in the initial partitioning is still used, and the output sequence is: a4, a5, a6, a7, a8, a9, a10, a11, a12, a13, a14, a15, a16, a17, a18, a19, a20, and a21. Then, a digit sequence that is output is 420921198909265138.

For the number area of the picture of the identification card, a plurality of pieces of picture data may be obtained through partitioning. Step 220 to step 250 are successively performed respectively by using the first classifier and the second classifier, to calculate a confidence value for each piece of picture data, and a digit corresponding to each first probability is respectively output in sequence, thereby implementing digit recognition for a number in an identification card, for example, the identification card number.

In the embodiments of this application, similarly, after picture data is obtained, calculation is performed on the picture data by using the calculation layers shared by the first classifier and the second classifier, to obtain first result; then calculation is separately performed by bringing the first result into the remaining calculation layers other than the shared calculation layers in the first classifier, to obtain the first probability corresponding to each character; calculation is performed by bringing the first result into the remaining calculation layers other than the shared calculation layers in the second classifier, to obtain the second probability; the confidence value that the picture data is recognized as each character is calculated based on the first probability and the second probability; and finally the character recognition result is output based on the confidence value. Character recognition efficiency and accuracy are increased compared with the background technology.

In addition, in this application, in a process of training the first classifier and the second classifier, either of the classifiers may be first trained, and then the calculation layers shared between the first classifier and the second classifier are fixed, to continue to train calculation layers of the other untrained classifier. Compared with the background technology, training workload is reduced, and efficiency of training the first classifier and the second classifier is also increased. The character recognition efficiency and accuracy are further increased.

It should be noted that the method embodiments are expressed as a series of action combinations for the purpose of brief description, but persons of ordinary skill in the art should know that because some steps may be performed in other sequences or simultaneously according to the embodiments of this application, the embodiments of this application are not limited to a described action sequence. In addition, persons skilled in the art should also know that the embodiments described in this specification are all preferable embodiments; and therefore, an action involved is not necessarily mandatory in the embodiments of this application.

Embodiment 3

Figure 3:
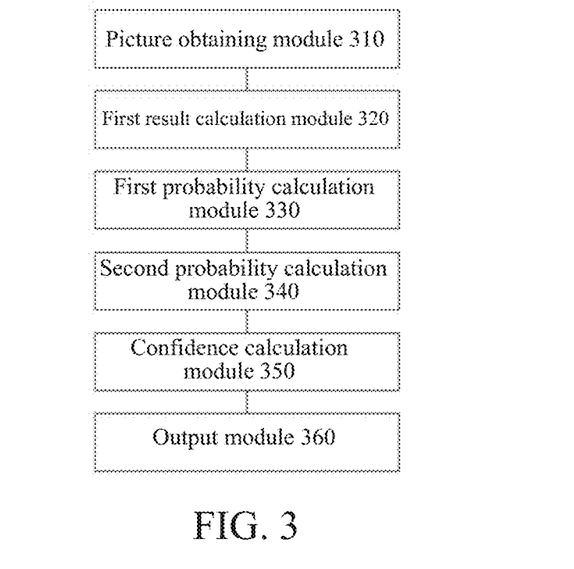
FIG. 3 is a structural block diagram of an embodiment of a character recognition apparatus according to this application.

Referring to FIG. 3, FIG. 3 is a structural block diagram of an embodiment of a character recognition apparatus according to this application. The apparatus may specifically include the following modules:

a picture obtaining module 310, suitable for obtaining picture data:

a first result calculation module 320, suitable for performing calculation on the picture data by using calculation layers shared by a first classifier and a second classifier, to obtain a first result, where the first classifier is a classifier for recognizing a specific character in the picture data, and the second classifier is a classifier for recognizing whether the picture data is a character picture;

a first probability calculation module 330, suitable for performing calculation by bringing the first result into remaining calculation layers other than the shared calculation layers in the first classifier, to obtain a first probability corresponding to each character;

a second probability calculation module 340, suitable for performing calculation by bringing the first result into remaining calculation layers other than the shared calculation layers in the second classifier, to obtain a second probability;

a confidence value calculation module 350, suitable for calculating, based on the first probability and the second probability, a confidence value that the picture data is recognized as each character; and an output module 360, suitable for outputting a character recognition result based on the confidence value.

In another preferable embodiment of this application, before the first result calculation module 320, the apparatus further includes:

a first classifier training module 370, suitable for training parameters of each calculation layer of the first classifier by using character picture samples, where the first classifier includes first N calculation layers and last M calculation layers.

In another preferable embodiment of this application, before the second probability calculation module 340, the apparatus further includes:

a second classifier training module 380, suitable for fixing parameters of first N calculation layers of the second classifier with parameters of the first N calculation layers of the first classifier, and training parameters of last L layers of the second classifier by using non-character picture samples and character picture samples.

In the embodiments of this application, after picture data is obtained, calculation is performed on the picture data by using the calculation layers shared by the first classifier and the second classifier, to obtain first result; then calculation is separately performed by bringing the first result into the remaining calculation layers other than the shared calculation layers in the first classifier, to obtain the first probability corresponding to each character; calculation is performed by bringing the first result into the remaining calculation layers other than the shared calculation layers in the second classifier, to obtain the second probability; the confidence value that the picture data is recognized as each character is calculated based on the first probability and the second probability; and finally the character recognition result is output based on the confidence value.

The second classifier shares some calculation layers with the first classifier. For the calculation layers shared by the second classifier and the first classifier, a calculation process and a calculation result thereof are also shared. Therefore, compared with the background technology in which a complete classifier is added, this application increases a relatively little calculation amount, thereby increasing character recognition efficiency compared with the background technology.

In addition, the second classifier and the first classifier are not used in sequence, but probability values respectively obtained by the two classifiers are multiplied by each other to obtain a confidence value, and then a corresponding recognition result is outputted based on the confidence value, thereby increasing character recognition accuracy compared with the background technology.

Embodiment 4

Figure 4:
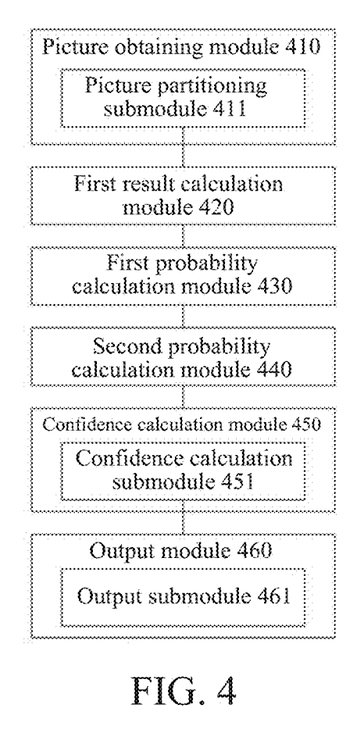
FIG. 4 is a structural block diagram of an embodiment of a character recognition apparatus according to this application.

Referring to FIG. 4, FIG. 4 is a structural block diagram of an embodiment of a character recognition apparatus according to this application. The apparatus may specifically include the following modules:

a picture obtaining module 410, suitable for obtaining picture data; and specifically including:

a picture partitioning submodule 411, suitable for partitioning each piece of picture data from a number area of a picture of an identification card;

a first result calculation module 420, suitable for performing calculation on the picture data by using calculation layers shared by a first classifier and a second classifier, to obtain a first result, where the first classifier is a classifier for recognizing a specific character in the picture data, and the second classifier is a classifier for recognizing whether the picture data is a character picture;

a first probability calculation module 430, suitable for performing calculation by bringing the first result into remaining calculation layers other than the shared calculation layers in the first classifier, to obtain a first probability corresponding to each character;

a second probability calculation module 440, suitable for performing calculation by bringing the first result into remaining calculation layers other than the shared calculation layers in the second classifier, to obtain a second probability;

a confidence value calculation module 450, suitable for calculating, based on the first probability and the second probability, a confidence value that the picture data is recognized as each character; and specifically including:

a confidence value calculation submodule 451, suitable for multiplying a maximum first probability by the second probability, to obtain a confidence value that the picture data is a digit corresponding to the maximum first probability; and an output module 460, suitable for outputting a character recognition result based on the confidence value; and specifically including:

an output submodule 461, suitable for selecting, from each piece of picture data, digits corresponding to a number of pictures that rank on the top (i.e., the pictures whose maximum probability of being a digit rank on the top among all the pictures), the number being consistent with the number of digits on the identification card, and outputting the digits in sequence.

In this embodiment of this application, similarly, after picture data is obtained, calculation is performed on the picture data by using the calculation layers shared by the first classifier and the second classifier, to obtain first result; then calculation is separately performed by bringing the first result into the remaining calculation layers other than the shared calculation layers in the first classifier, to obtain the first probability corresponding to each character; calculation is performed by bringing the first result into the remaining calculation layers other than the shared calculation layers in the second classifier, to obtain the second probability; the confidence value that the picture data is recognized as each character is calculated based on the first probability and the second probability; and finally the character recognition result is output based on the confidence value. Character recognition efficiency and accuracy are increased compared with the background technology.

In addition, in this application, in a process of training the first classifier and the second classifier, either of the classifiers may be first trained, and then the calculation layers shared between the first classifier and the second classifier are fixed, to continue to train calculation layers of the other untrained classifier. Compared with the background technology, training workload is reduced, and efficiency of training the first classifier and the second classifier is also increased. The character recognition efficiency and accuracy are further increased.

The apparatus embodiments are substantially similar to the method embodiments and therefore are only briefly described, and reference may be made to the method embodiments for the corresponding sections.

It should be noted that the embodiments in this specification are all described in a progressive manner. Description of each of the embodiments focuses on differences from other embodiments, and reference may be made to each other for the same or similar parts among respective embodiments.

Persons skilled in the art should understand that, the embodiments of this application may be provided as methods, apparatuses, or computer program products. Therefore, the embodiments of this application may use a form of total hardware embodiments, total software embodiments, or embodiments combining software and hardware. In addition, the embodiments of this application may use a form of a computer program product implemented on one or more computer readable storage media (including but not limited to a disk memory, a CD-ROM, an optical memory, and the like) including computer readable program code.

In a typical configuration, the computer device includes one or more processors (CPU), input/output interfaces, network interfaces, and memories. The memories may include forms of computer readable media, such as a volatile memory, a random access memory (RAM), and/or a non-volatile memory, for example, a read-only memory (ROM) or a flash memory (flash RAM). A memory is an example of the computer readable media. The computer readable media include non-volatile and volatile, and mobile and non-mobile media, and can implement information storage by using any method or technology. Information may be computer readable instructions, a data structure, and a module or other data of a program. Examples of the computer storage media include but are not limited to a phase change memory (PRAM), a static random access memory (SRAM), a dynamic random access memory (DRAM), or another type of random access memory (RAM), a read-only memory (ROM), an electrically erasable programmable read-only memory (EEPROM), a flash memory, or another memory technology, a compact disc read-only memory (CD-ROM), a digital versatile disc (DVD), or another optical storage, a cassette tape, a magnetic tape, a magnetic disk storage, or another magnetic storage device, and any other non-transmission medium, and may be configured to store information that is accessible to the computer device. As defined by this document, the computer storage media do not include transitory computer readable media (transitory media), such as a modulated data signal and a modulated carrier.

The embodiments of this application is described with reference to flowcharts and/or block diagrams of the method, the terminal device (the system), and the computer program product in the embodiments of this application. It will be appreciated that computer program instructions may be used for implementing each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing terminal device to generate a machine, so that the instructions executed by a computer or a processor of any other programmable data processing terminal device generate an apparatus for implementing a specific function in one or more processes in the flowcharts and/or in one or more blocks in the block diagrams.

These computer program instructions may further be stored in a computer readable memory that can instruct the computer or any other programmable data processing terminal device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may further be loaded onto a computer or another programmable data processing terminal device, so that a series of operations and steps are performed on the computer or the another programmable terminal device, thereby generating computer-implemented processing. Therefore, the instructions executed on the computer or the another programmable terminal device provide steps for implementing a specific function in one or more processes in the flowcharts and/or in one or more blocks in the block diagrams.

Although preferable embodiments of the embodiments of this application have been described, once persons skilled in the technology know a basic creative concept, they can make other changes and modifications to these embodiments. Therefore, the following claims are intended to cover the preferable embodiments and all changes and modifications falling within the scope of the embodiments of this application.

Finally, it should be noted that the relational terms herein such as first and second are used only to differentiate an entity or operation from another entity or operation, and do not require or imply any actual relationship or sequence between these entities or operations. Moreover, the terms "comprise", "include", or any other variant thereof is intended to cover a non-exclusive inclusion, so that a process, a method, an article, or a terminal device that includes a list of elements not only includes those elements but also includes other elements that are not expressly listed, or further includes elements inherent to such a process, method, article, or terminal device. An element preceded by "includes a . . . " does not, without more constraints, preclude the presence of additional identical elements in the process, method, article, or terminal device that includes the element.

A character recognition method and a character recognition apparatus that are provided in this application are described in detail above. The principle and implementations of this application are described herein by using specific examples. The descriptions of the embodiments of this application are merely used for helping understand the method and core ideas of this application. In addition, persons of ordinary skill in the art can make variations to this application in terms of the specific implementations and application scopes according to the ideas of this application. Therefore, the content of the specification shall not be construed as a limit to this application.

What is claimed is:

1. A character recognition method, comprising:
    training parameter values of calculation layers of a first classifier by using character picture samples, wherein the first classifier comprises a first N calculation layers and a last M calculation layers of calculation layers shared by the first classifier and a second classifier; and
    fixing parameters of a first N calculation layers of the second classifier with parameters of the first N calculation layers of the first classifier, and training parameter values of a last L layers of the second classifier by using non-character picture samples and the character picture samples;
    obtaining picture data;
    performing calculation on the picture data by using the calculation layers shared by the first classifier and the second classifier, to obtain a first result, wherein the first classifier is a classifier for recognizing a specific character in the picture data, and the second classifier is a classifier for recognizing whether the picture data is a character picture;
    performing calculation by bringing the first result into remaining calculation layers other than the shared calculation layers in the first classifier, to obtain a first probability corresponding to each character;
    performing calculation by bringing the first result into remaining calculation layers other than the shared calculation layers in the second classifier, to obtain a second probability;
    calculating, based on the first probability and the second probability, a confidence value that the picture data is recognized as each character; and
    outputting a character recognition result based on the confidence value.

2. The method according to claim 1, wherein the calculation layers shared by the first classifier and the second classifier comprises:
    a convolutional layer, or a convolutional layer and at least one fully connected layer.

3. The method according to claim 1, wherein the character is a digit.

4. The method according to claim 3, wherein the step of obtaining picture data comprises:
    partitioning each piece of picture data from a number area of a picture of an identification card.

5. The method according to claim 4, wherein the step of calculating, based on the first probability and the second probability, a confidence value that the picture data is recognized as each character comprises:

multiplying a maximum first probability by the second probability, to obtain a confidence value that the picture data is a digit corresponding to the maximum first probability.

6. The method according to claim 5, wherein the step of outputting a character recognition result based on the confidence value comprises:
selecting a number of digits that have the maximum confidence values, the number being consistent with the number of digits on the identification card, and outputting the digits.

7. The method according to claim 6, wherein partitioning each piece of picture data from a number area of a picture of an identification card comprises recording an order of the piece of picture data on the identification card.

8. The method according to claim 7, wherein outputting the digits comprises outputting the digits according to the order of the piece of picture data that each digit corresponds to.

9. A system for character recognition, the system comprising:
one or more processors; and
a memory storing instructions that, when executed by the one or more processors, cause the system to perform:
obtaining picture data, by partitioning each piece of picture data from a number area of a picture of an identification card;
performing calculation on the picture data by using calculation layers shared by a first classifier and a second classifier, to obtain a first result, wherein the first classifier is a classifier for recognizing a specific character in the picture data, and the second classifier is a classifier for recognizing whether the picture data is a character picture;
performing calculation by bringing the first result into remaining calculation layers other than the shared calculation layers in the first classifier, to obtain a first probability corresponding to each character, wherein each character is a digit;
performing calculation by bringing the first result into remaining calculation layers other than the shared calculation layers in the second classifier, to obtain a second probability;
calculating, based on the first probability and the second probability, a confidence value that the picture data is recognized as each character, by multiplying a maximum first probability by the second probability to obtain a confidence value that the picture data is a digit corresponding to the maximum first probability; and
outputting a character recognition result based on the confidence value.

10. The system according to claim 9, wherein the instructions further cause the system to perform:
training parameter values of each calculation layer of the first classifier by using character picture samples, wherein the first classifier comprises first N calculation layers and last M calculation layers; and
fixing parameters of first N calculation layers of the second classifier with parameters of the first N calculation layers of the first classifier, and training parameter values of last L layers of the second classifier by using non-character picture samples and character picture samples.

11. The system according to claim 9, wherein the calculation layers shared by the first classifier and the second classifier comprises:
a convolutional layer, or a convolutional layer and at least one fully connected layer.

12. The system according to claim 9, wherein outputting a character recognition result based on the confidence value comprises:
selecting a number of digits that have the maximum confidence values, the number being consistent with the number of digits on the identification card, and outputting the digits.

13. The system according to claim 12, wherein partitioning each piece of picture data from a number area of a picture of an identification card comprises recording an order of the piece of picture data on the identification card.

14. The system according to claim 13, wherein outputting the digits comprises outputting the digits according to the order of the piece of picture data that each digit corresponds to.

15. A system for character recognition, comprising:
one or more processors; and
a memory storing:
a first classifier that, when executed by the one or more processors, causes the system to recognize a specific character in picture data, the first classifier comprising at least two convolutional layers, at least two fully connected layers, and at least one Softmax layer; and
a second classifier that, when executed by the one or more processors, causes the system to recognize whether the picture data is a picture of a character, the second classifier comprising at least two convolutional layers, at least two fully connected layers, and at least one Softmax layer,
wherein the first classifier and the second classifier share at least two convolutional layers and at least one fully connected layer.

* * * * *